F. M. SHELDEN.
SEED DRILL.
APPLICATION FILED MAY 1, 1911.
1,018,933.
Patented Feb. 27, 1912.
5 SHEETS—SHEET 4.
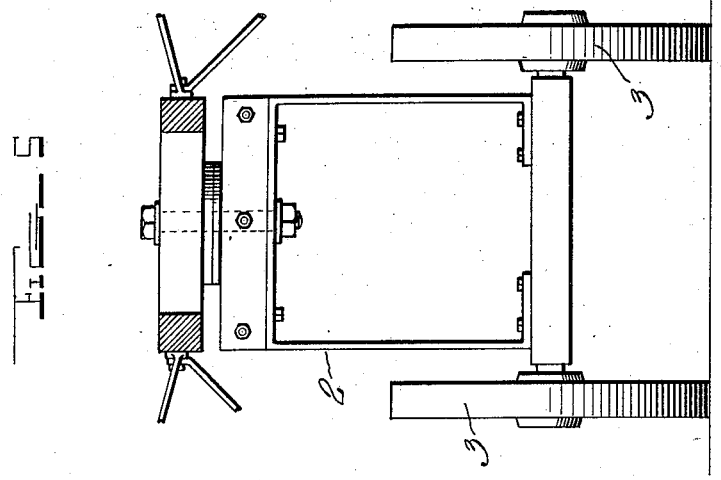
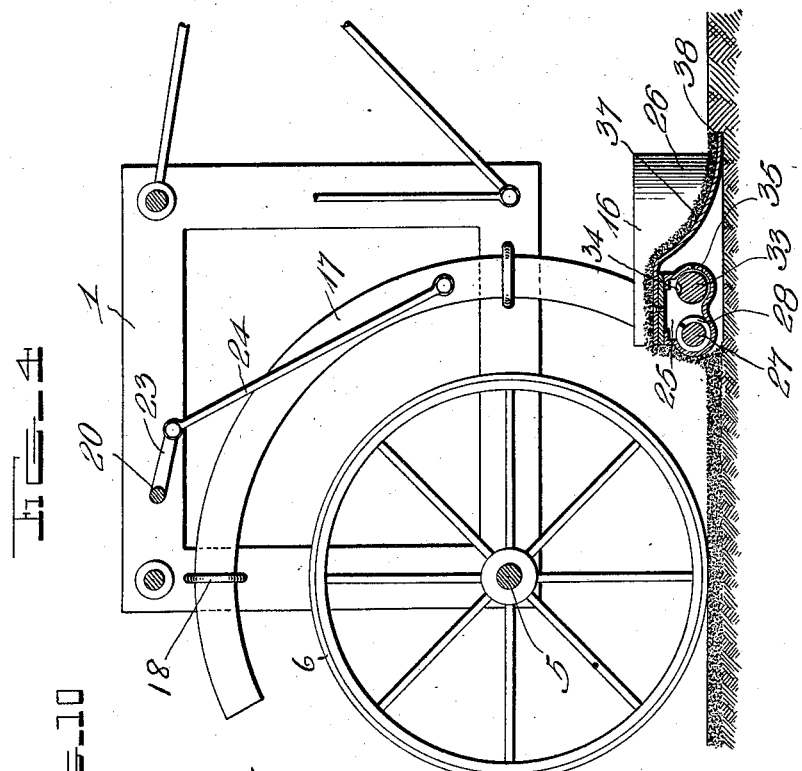

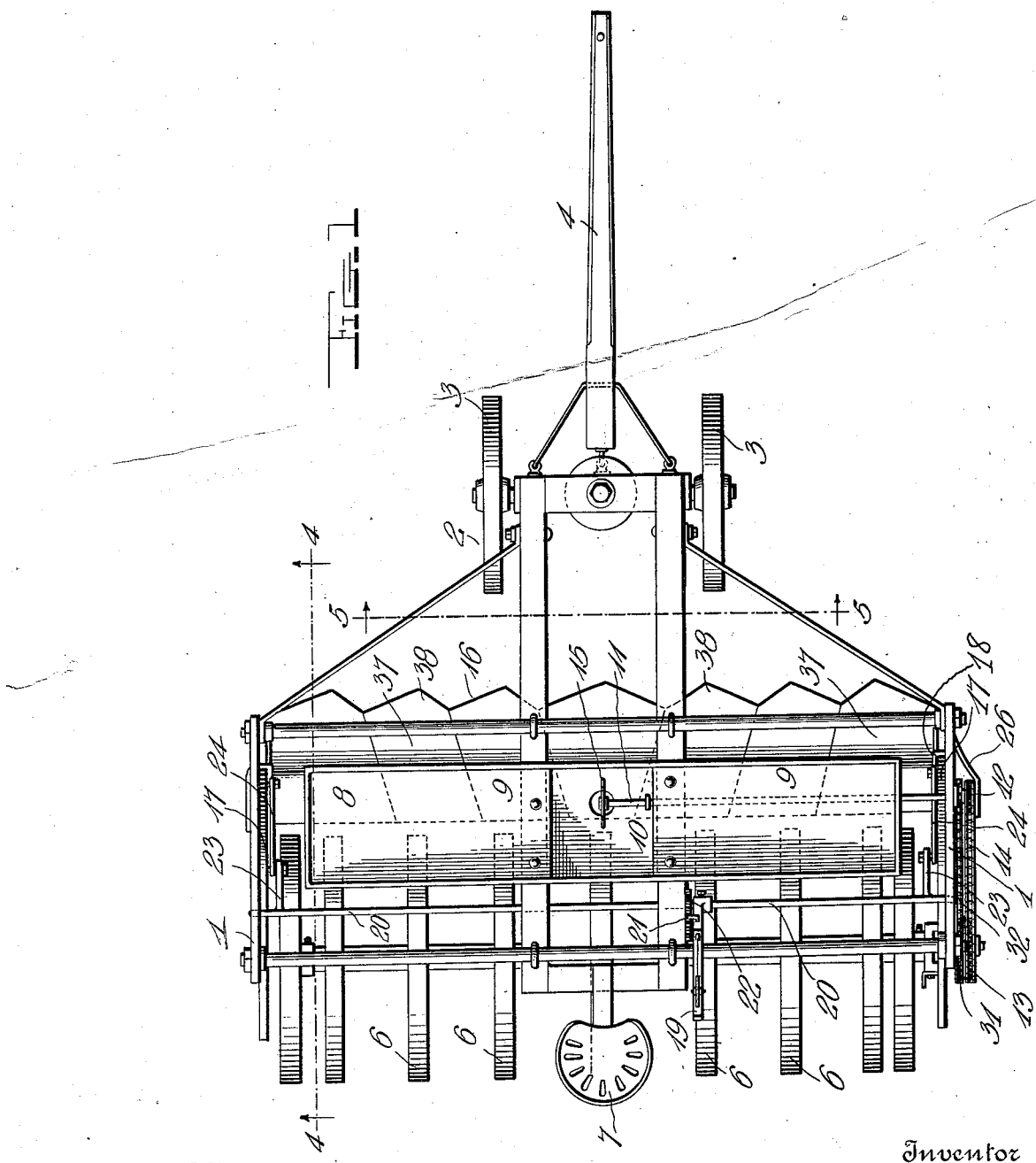

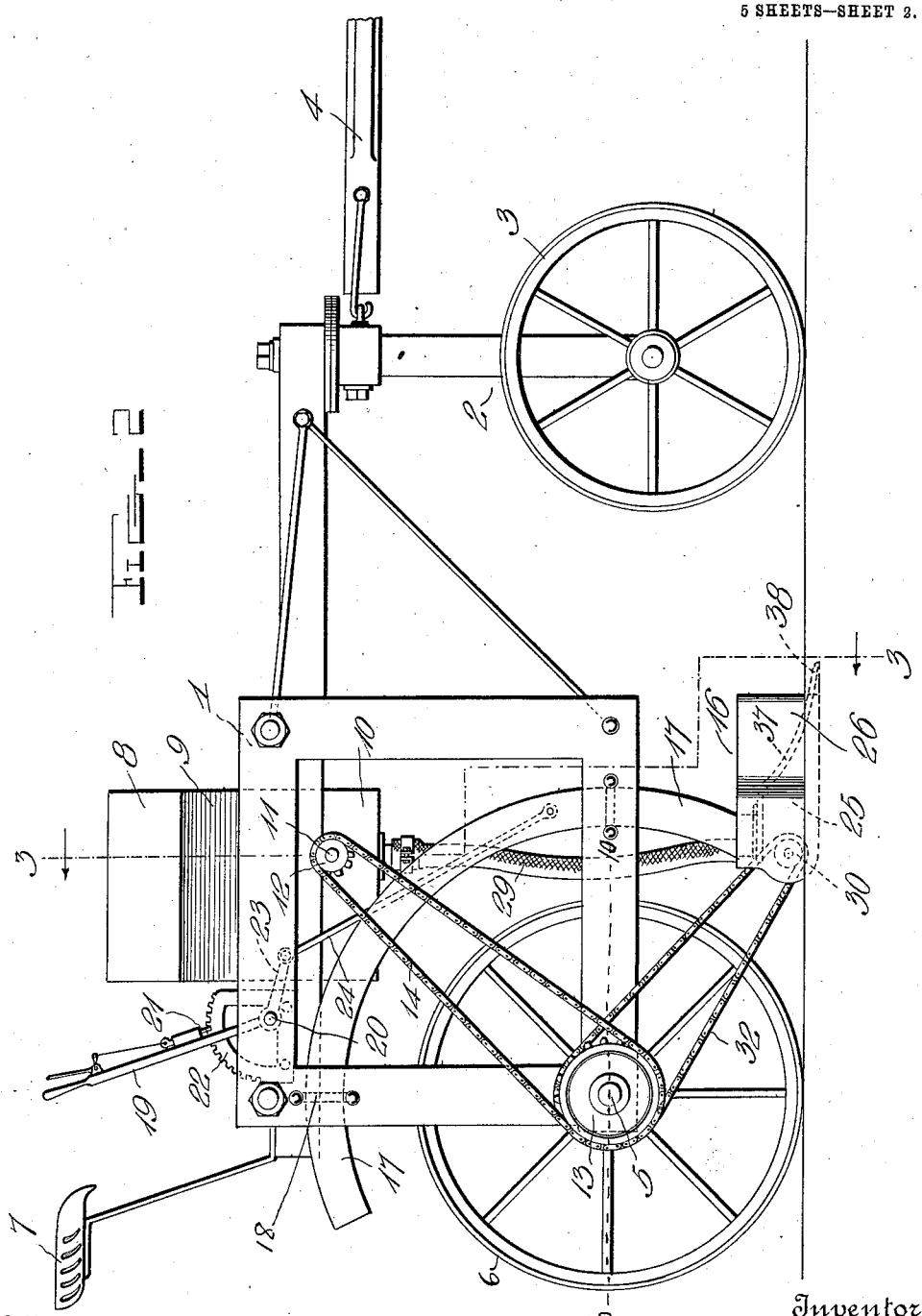

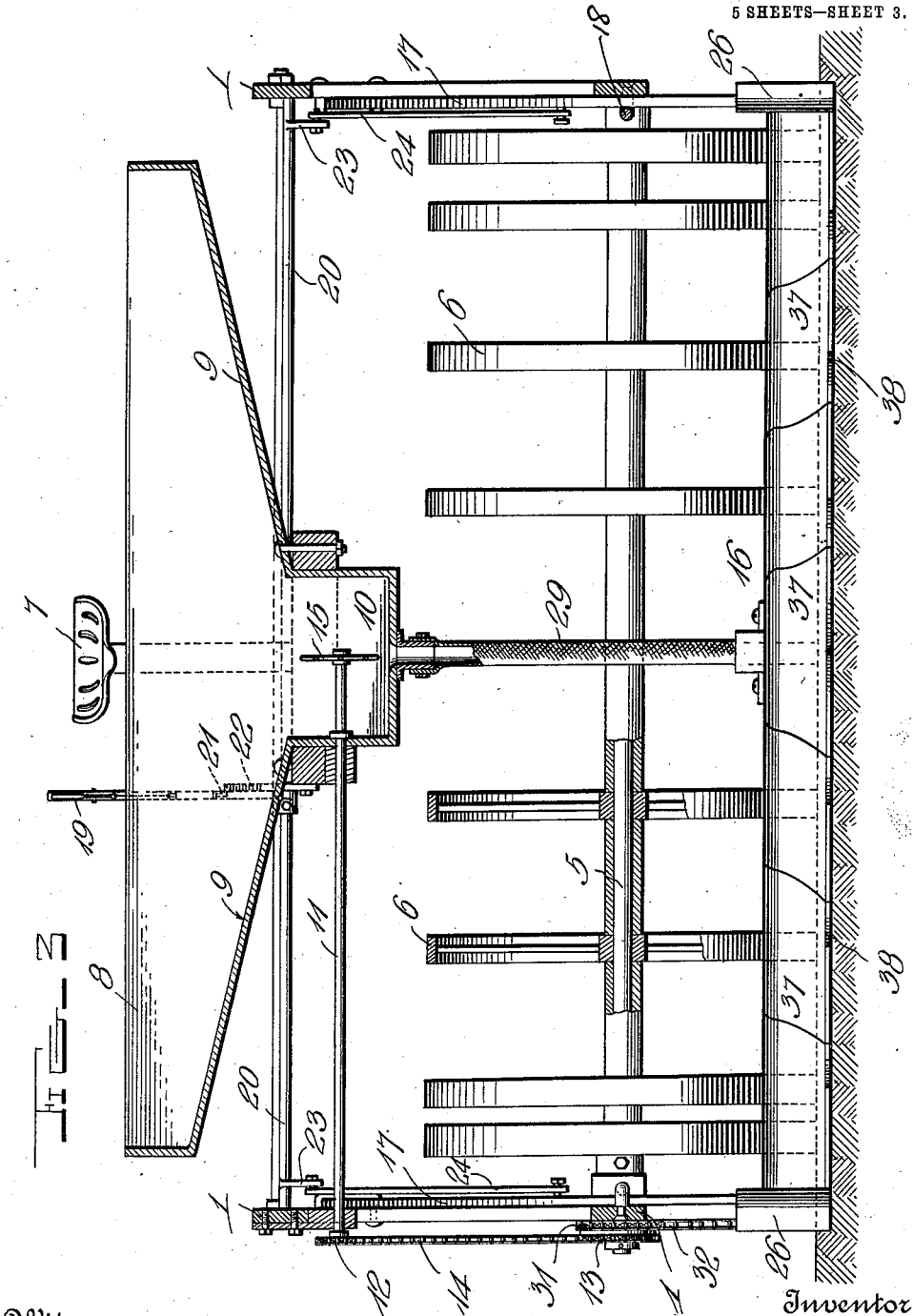

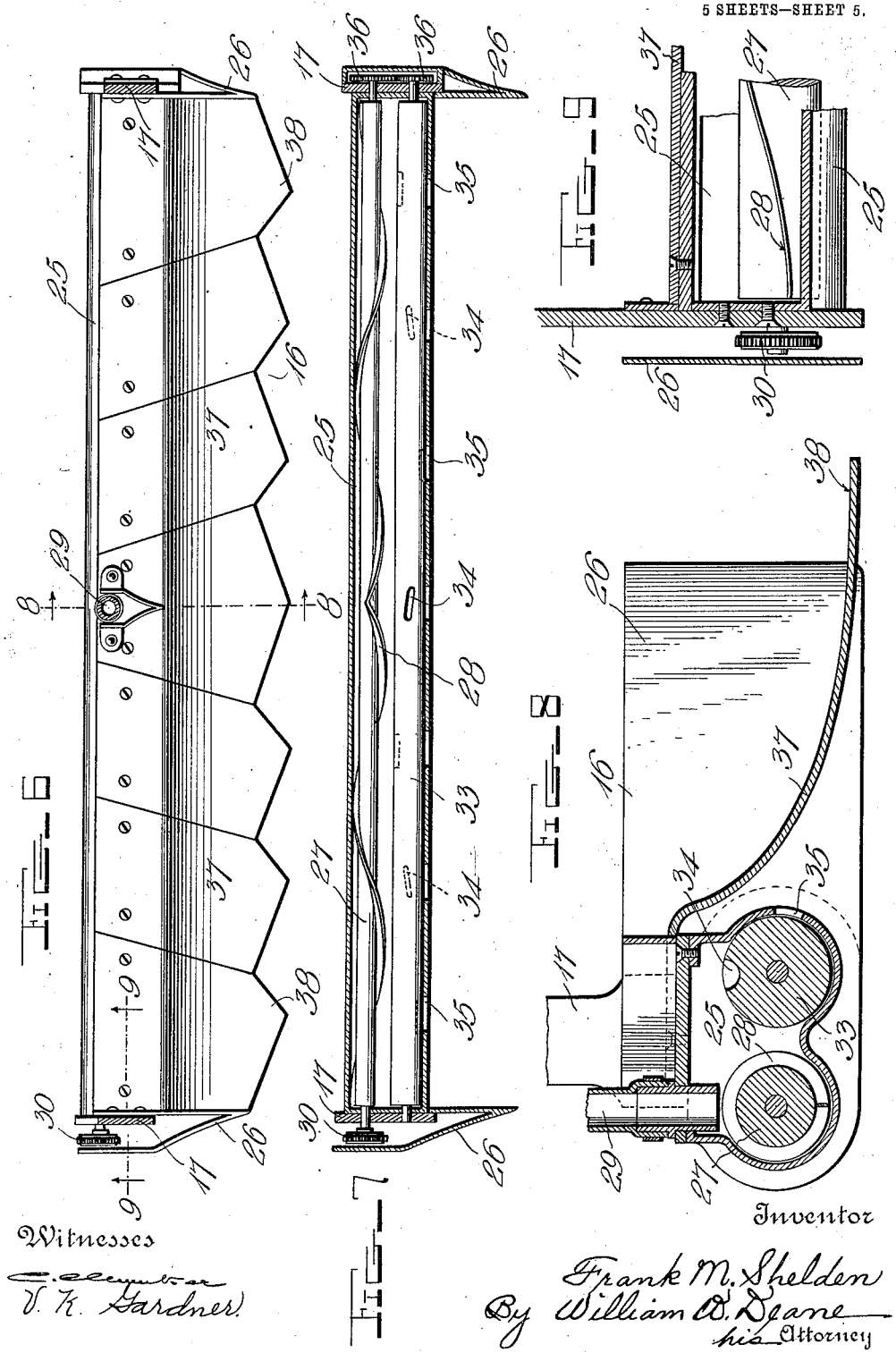

UNITED STATES PATENT OFFICE.

FRANK M. SHELDEN, OF NEWCASTLE, WYOMING.

SEED-DRILL.

1,018,933.  Specification of Letters Patent.  Patented Feb. 27, 1912.

Application filed May 1, 1911. Serial No. 624,424.

*To all whom it may concern:*

Be it known that I, FRANK M. SHELDEN, citizen of the United States, residing at Newcastle, in the county of Weston and State of Wyoming, have invented certain new and useful Improvements in Seed-Drills, of which the following is a specification.

This invention relates to seed drills, and has for its object to provide a drill in which furrows are opened in the soil, seed is deposited and covered, all substantially at the same time.

With this object in view, the drill includes a frame, the rear portion of which is mounted upon an axle, upon which rollers are mounted whereby the axle and rollers will rotate. The forward portion of the frame is supported by a tongue truck and means is provided for raising and lowering the frame with relation to the surface of the soil. A seed hopper is mounted upon the frame and a stirrer is journaled for rotation therein. Means is provided for operating the stirrer from the axle.

A member which will now be considered in general as a furrow opener, seed distributer, and dropper is carried by the frame, and a seed tube leads from the hopper to the said member. The seed distributing device is operatively connected with the axle and is also operatively connected with the seed dropping device. These last mentioned devices are located behind the furrow openers, but in advance of the roller, consequently the seed is distributed along the dropper which takes the same up and deposits it in the furrows which have just been opened and these lines of seed in the furrows are subsequently but almost immediately covered by the rollers which constitute the principal supporting member of the frame of the machine.

In the accompanying drawings:—Figure 1 is a top plan view of the seed drill; Fig. 2 is a side elevation of the same; Fig. 3 is a transverse sectional view of the same; cut on the line 3—3 of Fig. 2; Fig. 4 is a vertical sectional view of the same, cut on the line 4—4 of Fig. 1; Fig. 5 is a transverse sectional view of the same cut on the line 5—5 of Fig. 1; Fig. 6 is a top plan view of the furrow opener with parts in section; Fig. 7 is a horizontal sectional view of the seed distributer; Fig. 8 is a vertical sectional view of the furrow opener, cut on the line 8—8 of Fig. 6; Fig. 9 is a vertical transverse sectional view of a portion of the furrow opener cut on the line 9—9 of Fig. 6. Fig. 10 is a detail horizontal sectional view of a portion of the drill cut on the line 10—10 of Fig. 2, showing a clutch device that may be used upon the drill.

Corresponding and like parts are referred to in the following description and indicated in all the views of the accompanying drawings by the same reference characters.

The seed drill includes a frame 1 which is mounted at its forward portion upon a pivoted tongue truck 2. The said truck includes supporting wheels 3 and the rear end of a draft tongue 4 is pivotally connected by any appropriate means with the truck 2. The truck 2 is free to swing horizontally with relation to the frame 1 but is constrained against relative movement in any other direction. An axle 5 is journaled in the rear portion of the frame 1 and rollers 6 are mounted upon the said axle between the side portions of the said frame. An operator's seat 7 is mounted upon the upper, intermediate rear portion of the frame 1. A hopper 8 is mounted upon the upper forward portion of the frame 1 and is provided with downwardly and inwardly inclined bottom sections 9 which converge toward a pit 10 provided at the intermediate portion of the bottom of the hopper 8. A shaft 11 is journaled in the side of the pit 10 and at its outer end is provided with a sprocket wheel 12. A sprocket wheel 13 is located at one end portion of the axle 5 and a sprocket chain 14 is trained around the sprocket wheels 12 and 13. Therefore it will be seen that as the axle 5 rotates, rotary movement is transmitted through the sprocket wheel 13, chain 14 and sprocket wheel 12 to the shaft 11, and a stirrer 15, which is located in the pit 10 of the hopper, is rotated and keeps the seed within the hopper in a state of activity over the discharge outlet thereof, as will be hereinafter explained.

A furrow opener is supported from the frame 1, and for the purposes of clearness the said furrow opener is designated in general as at 16 and best seen in Fig. 2 of the drawings. Arcuate arms 17 are secured at their lower ends to the said furrow opener 16 and at their upper portions are trained through guides 18 provided at the side portions of the frame 1. A lever 19 is fulcrumed upon the frame 1 and is provided with a fixed shaft 20 which is journaled in bearings provided at the end portions of the frame 1. The said lever 19 is within convenient reach of one occupying the seat 7, and the said lever is provided with a spring actuated pawl 21 adapted to engage the teeth of a segment 22, which is mounted upon the frame 1 and whereby the lever 19 and its attached shaft 20 may be held in an adjusted position. The shaft 20 is provided in the vicinity of its ends with forwardly disposed arms 23 and link rods 24 are connected at their upper ends with the said arms 23 and are pivotally connected at their lower ends with the segmental arms 17 which are attached at their lower ends to the furrow opener 16. Therefore it will be seen that by swinging the lever 19 and turning the shaft 20 the arms 23 will be moved about the axis of the said shaft whereby the arcuate arms 17 will be moved longitudinally in the guides 18 and the furrow opener may be raised or lowered with relation to the surface of the soil so that it may operate at a desired depth below the same or may be carried entirely above the same.

The furrow opener hereinbefore referred to generally at 16 includes a casing 25 which is provided at its ends with soil dividing shoes or runners 26. A worm drum 27 is journaled for rotation in the rear portion of the casing 25 and is provided upon its periphery with a worm 28 which is reversed in its disposition from a point intermediate the ends of the said drum to the ends thereof. A flexible grain tube 29 is connected at its upper end with the hopper 8 through the bottom of the pit 10 thereof and has its upper end disposed immediately below the stirrer 15 located in the said pit. The lower end of the tube 29 communicates with the interior of the casing 25 immediately above the periphery of the worm drum 27 and above the intermediate points of the worm 28 thereof where the end portions of the said worm 28 join each other and are reversely disposed. A sprocket wheel 30 is fixed to the shaft of the worm drum 27 and is located within the side portions of one of the shoes 26. A sprocket wheel 31 is located on the axle 5 and a sprocket chain 32 is trained around the wheels 30 and 31 and is adapted to transmit rotary movement from the axle 5 to the shaft and the worm drum 27.

A seed separating drum 33 is journaled for rotation in the forward portion of the casing 25 and is provided at intervals along its periphery with recesses 34 which are spirally disposed along the length of the drum 33. The casing 25 is provided at its forward portion with seed outlet openings 35 which are located just in advance of the paths of movement of the recesses 34. The drums 27 and 33 are provided at one end with intermeshing gear wheels 36 which are located between the side portions of that runner 26 located at the opposite end of the furrow opener 16 from the runner which receives between its side portions the sprocket wheel 30. Shovels 37 are mounted at their rear portions upon the top of the casing 25 and extend forwardly and downwardly and are each provided with a pointed extremity 38 which extremities are approximately horizontally disposed but which are designed to cut shallow furrows in the soil which furrows are adapted to receive the seed which is passed out of the discharge outlet opening 35 of the casing 25, as will now be explained.

As the drill is drawn along a field, the pointed extremities 38 will open shallow furrows in the surface of the soil. At the same time the roller 6 and axle 5 are rotated and through the sprocket wheel 31, chain 33 and sprocket wheel 30, rotary movement is transmitted from the said axle to the worm drum 27. In the meantime the stirrer 15 which is maintained in a state of rotation as hereinbefore described, passes the seed down from the hopper 8 and pit 10 through the tube 29 into the upper portion of the casing 25 and upon the upper intermediate part of the drum 27. This seed is immediately caught up by the worm 28 and passed in approximately equal quantities along the drum 27 toward the opposite ends thereof. In the meantime the seed separating drum 33 is rotated from the drum 27 by the intermeshing gear wheels 36, and as the worm 28 throws the seed toward the periphery of the drum 33, each recess 34 in the drum 33 receives its fill of seed and carries the same over to its particular seed delivery outlet 35 in the casing 25. When the recesses 34 arrive successively at the discharge outlet 35, the seed falls by gravity from the recesses 34 through the outlet 35 into the furrows made by the pointed extremities 38 of the plate 37. The rollers 6 following behind crush down the soil at the side edges of the furrows over and upon the seed thus deposited, whereby the seed is covered and the surface of the planted field is left in a substantially level condition.

Having thus described the invention, what is claimed as new is:

1. In a seed drill, a casing having a seed opening at a point intermediate the ends thereof and provided with a series of seed outlet openings, a seed distributing means located in the casing, a seed selecting and dropping device journaled for rotation in the casing in advance of the distributing means and having peripheral recesses adapted to register at times with the seed outlet openings of the casing, and furrow openers attached directly to the casing and projecting beyond the forward side thereof.

2. In a seed drill, a casing having a seed inlet opening and a seed outlet opening, means for distributing the seed along the casing, a seed selecting and dropping means located in the casing, and a furrow opener attached to the casing and adapted to lift the furrow slice over the casing and deposit the same in the furrow behind the casing.

3. In a seed drill, a casing having seed outlet openings and provided at its ends with shoes, means for delivering seed to the casing at a point between the end portions, a seed distributing drum located within the casing, means for operating said drum which is housed within a shoe at one end of the casing, a seed conveying drum also located within the casing and arranged to convey seed from the distributing drum to the outlet openings of the casing, means for operating the second mentioned drum from the first mentioned drum and housed within the other shoe, and means carried by the casing for opening furrows in the soil in advance of the said outlet openings.

4. A seed drill, comprising a frame supported upon a journaled member, a hopper carried by the frame, said frame having guides, a furrow opener located below the frame, means for conveying seed from the hopper to the furrow opener, arcuate arms attached to the furrow opener and trained through the guides, a lever mechanism mounted upon the frame and operatively connected with the guides to raise and lower the same and the furrow opener.

In testimony whereof I affix my signature in presence of two witnesses.

FRANK M. SHELDEN.

Witnesses:
C. A. SPRINGMYER,
W. H. COLES.

---

Copies of this patent may be obtained for five cents each, by addressing the "Commissioner of Patents, Washington, D. C."